April 30, 1957 S. L. TESTA 2,790,184
PET RUNWAY FOR VEHICLES
Filed June 4, 1954
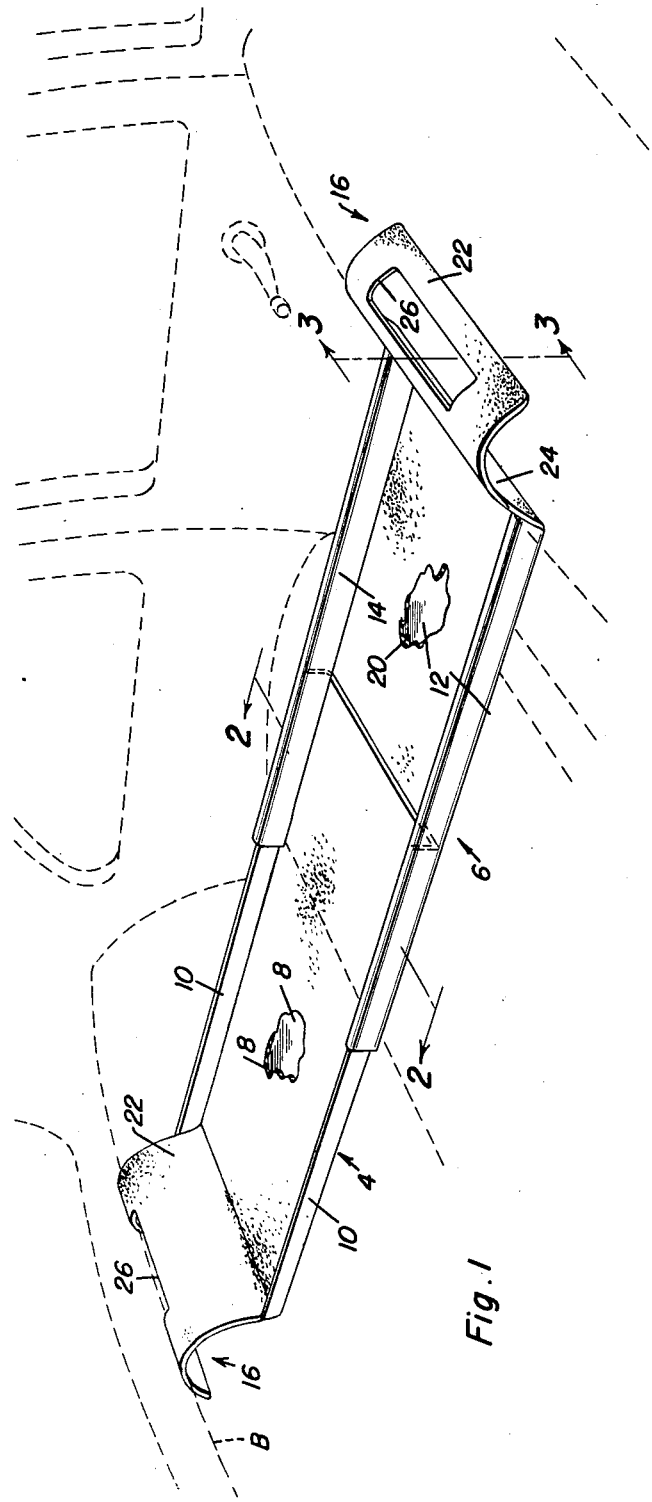
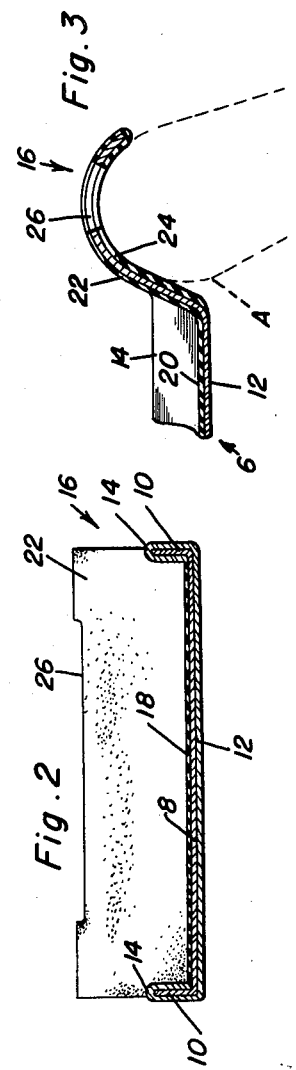
Sydney L. Testa
INVENTOR.

U̇nited States Patent Office 2,790,184
Patented Apr. 30, 1957

2,790,184

PET RUNWAY FOR VEHICLES

Sydney L. Testa, Shreveport, La.

Application June 4, 1954, Serial No. 434,425

2 Claims. (Cl. 5—118)

The present invention relates to a readily applicable and removable automobile seat attachment which is expressly designed for use in an automobile or equivalent vehicle and is expressly adapted to serve as a support and runway for one or more pets.

It is a matter of common knowledge that owners of pets, cats and dogs, for example, follow the practice of taking their pets along when riding in an automobile. It is thought to be undesirable, however, to allow a pet the privilege of cavorting about on the seat upholstery, especially when seat covers are not in use. Others confronted with this problem have seen fit to provide receptacle-like beds and carriers. As will be evident from a mere glance at the views in the accompanying drawing, it is the purpose of the instant invention to structurally, functionally and otherwise improve upon known prior art devices in the same field of endeavor, and, in doing so, to provide a construction in which manufacturers and users will find their respective requirements and needs satisfactorily met.

The reader will also observe that in carrying out the principles of the present invention, the aforementioned pet runway is of a type which takes up a minimum amount of space in the automobile and is handily and conveniently suspended from the upper portions of the customary back rests of the front and rear seats.

Briefly summarized, a preferred embodiment of the invention has to do with a light weight economical, easy-to-use miniature type runway, a runway which is longitudinally elongated and is adjustable and is adapted to span the existing space between the customary front and back seat, said runway having hook-like supporting members at its respective transverse ends which are preferably bendable and adapted to handily take over and rest atop the back rests of said seats.

Then, too, novelty is predicated on a runway which is made up of telescopically connected extensible and retractible sections which have their upper surfaces covered with an appropriate material, such as rubber or canvas, the sections being constructed to provide a runway which is trough-like in cross-section, whereby to provide an appropriate bottom and spaced parallel longitudinal side walls which rise vertically from said bottom.

Other objects, features and advantages will become more readily apparent from the following description and the accompanying sheet of illustrative drawings.

In the drawings:

Figure 1 is a perspective view of a pet runway of the aforementioned attachment-type constructed in accordance with the invention and showing the manner in which the same is designed and used;

Figure 2 is a cross-section on an enlarged scale taken on th line 2—2 of Figure 1, looking in the direction of the arrows; and Figure 3 is a section on the approximate vertical line 3—3 of Figure 1, looking in the direction of the arrows.

It is repeated that the invention, as an over-all attachment or device, is characterized by a light weight but sturdy longitudinally extensible and contractible trough-like runway, this of appropriate material and dimensions. Aluminum or equivalent sheet material has been found to be satisfactory in the construction of the principal parts. The stated runway is made up of a pair of complemental shallow pan-like sections 4 and 6, respectively. The section 4 comprises a flat plate 8 which provides a suitable bottom, and this is provided along its lengthwise edges with upstanding spaced parallel flanges 10—10. The section 6 also comprises a flat plate 12 which provides the complemental bottom, and this is provided along its lengthwise edges with upstanding companion flanges 14—14 which are channel-shaped in cross-section so that the flanges 10 slide telescopically therein with the adjacent end portions of the respective plates slidably overlapping. It may be said, therefore, that these sections 4 and 6 are extensible and contractible, and that the runway is, consequently, of telescoping construction. This telescoping feature renders the runway adjustable and also permits the sections to collapse into compact form for carrying and storage. The respective sections 4 and 6 are provided at their outer transverse ends with curvature hook-like supporting members which are identical, and which are therefore denoted by the numerals 16—16. Each member is merely an extension of the bottom plate and is of bendable metal so that it may be conformably perched upon and thus removably "hooked" over the back rest with which it cooperates. In the drawings, in Figure 1, the upper portion of the front back rest is conveniently denoted at A, and the corresponding portion of the rear back rest at B. It will be evident, therefore, that the trough-like runway is suspended upon the back rests A and B and spans the space between the seats in a horizontal plane. The device may be placed close to the windows so that the pets may rove back and forth and have access to the windows of the automobile, all in an obvious manner.

A suitable covering or coating of rubber sheet material may be applied to the top surfaces of the respective plates 8 and 12, said material being denoted by the numerals 18 and 20 in Figure 1. Instead of using rubber sheet material, it is within the purview of the invention to employ canvas or an equivalent tough material which may be washed and kept clean. It is also within the concept of the invention to make this material antislipping, if desired. In respect to the hangers or support member 16—16, it will be noticed in Figure 3 that the top and bottom surfaces 22 and 24 are both covered to serve as suitable protectors. Then, too, the hangers or support members 16 may have slots 26 formed therein to assist one in readily bending the member to shape and size for conformation with the back rest on which it is perched.

Not only do the flanges 10 and 14 serve to reinforce the runway, they also provide confining walls so that the runway constitutes not only a satisfactory seat for the animal but in addition as a miniature bed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use in an automobile as a special accommodation for one or more pets, a miniature-type runway which is adapted to span the space between the customary front and back seats, said runway having means at its respective ends to removably rest atop the back rests of said seats, the top surface having a covering, canvas, for example, which is washable for cleanliness, said runway comprising an elongate trough, the latter made up of complemental sections telescopically joined with each other, said sections having bendable supporting members at their outer ends.

2. For use in an automobile, an elongate trough-like runway for a pet comprising a pair of elongate pan-like complemental sections, each section having a flat bottom and lengthwise spaced parallel marginal upstanding flanges, the flanges of the respective sections being telescopically connected with one another to permit adjacent end portions of the sections to overlap and to render the over-all runway extensible and contractible for adjustment and collapsing purposes, said sections being provided at their respective transverse ends with upstanding curvate hangers shaped and adapted to fittingly hook over the back rest portions of front and rear automobile seats, said hangers being hook-like in shape, each hanger being formed with a relatively large slot and being manually bent to desired curvature and size.

References Cited in the file of this patent

UNITED STATES PATENTS

| | | |
|---|---|---|
| 236,289 | Wooldridge | Jan. 4, 1881 |
| 883,001 | Curtis | Mar. 24, 1908 |
| 1,171,531 | Muther | Feb. 15, 1916 |
| 1,259,220 | Fischer | Mar. 12, 1918 |
| 1,872,740 | James | Aug. 23, 1932 |
| 1,890,163 | Rose | Dec. 6, 1932 |
| 1,912,514 | Curtis et al. | June 6, 1933 |
| 2,499,103 | Love | Feb. 28, 1950 |
| 2,696,246 | Putnam | Dec. 7, 1954 |

FOREIGN PATENTS

| | | |
|---|---|---|
| 73,670 | Switzerland | Nov. 1, 1916 |
| 682,102 | Great Britain | Nov. 5, 1952 |